(12) United States Patent
Agrawal et al.

(10) Patent No.: US 11,514,265 B2
(45) Date of Patent: Nov. 29, 2022

(54) INFERENCE VIA EDGE LABEL PROPAGATION IN NETWORKS

(71) Applicant: Microsoft Technology Licensing, LLC, Redmond, WA (US)

(72) Inventors: Parag Agrawal, Sunnyvale, CA (US);
Yan Wang, Sunnyvale, CA (US);
Aastha Jain, Sunnyvale, CA (US);
Hema Raghavan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 604 days.

(21) Appl. No.: 16/584,619

(22) Filed: Sep. 26, 2019

(65) Prior Publication Data
US 2021/0097339 A1 Apr. 1, 2021

(51) Int. Cl.
| | |
|---|---|
| *G06K 9/62* | (2022.01) |
| *G06F 17/18* | (2006.01) |
| *G06N 5/04* | (2006.01) |
| *G06N 20/00* | (2019.01) |

(52) U.S. Cl.
CPC .......... *G06K 9/6256* (2013.01); *G06F 17/18* (2013.01); *G06N 5/04* (2013.01); *G06N 20/00* (2019.01)

(58) Field of Classification Search
CPC ........ G06K 9/6256; G06N 20/00; G06N 5/04; G06F 17/18

USPC .......................................................... 706/45
See application file for complete search history.

(56) References Cited

U.S. PATENT DOCUMENTS

| | | | |
|---|---|---|---|
| 2014/0046959 A1* | 2/2014 | Moreels .............. | G06F 16/9024 707/748 |
| 2016/0055423 A1* | 2/2016 | Buchanan ............. | G16H 50/50 706/12 |
| 2019/0235936 A1* | 8/2019 | Murdock ................ | G06F 9/542 |
| 2019/0363959 A1* | 11/2019 | Rice ..................... | H04M 15/66 |
| 2020/0012718 A1* | 1/2020 | Kung .................... | G06N 20/00 |
| 2020/0167787 A1* | 5/2020 | Kursun ................. | H04L 67/306 |

* cited by examiner

*Primary Examiner* — William D Titcomb
(74) *Attorney, Agent, or Firm* — Schwegman Lundberg & Woessner, P.A.

(57) ABSTRACT

The disclosed embodiments provide a system for performing inference. During operation, the system obtains a graph containing nodes representing members of an online system, edges between pairs of nodes, and edge scores representing confidences in a type of relationship between the pairs of nodes. Next, the system performs a set of iterations that propagate a label for the type of relationship from a first subset of edges to remaining edges in the graph, with each iteration updating a probability of the label for an edge between a pair of nodes based on a subset of edge scores for a second subset of edges connected to one or both nodes in the pair and probabilities of the label for the second subset of edges. The system then performs one or more tasks in the online system based on the probability of the label for the edge.

20 Claims, 5 Drawing Sheets

INFERENCE VIA EDGE LABEL PROPAGATION IN NETWORKS

BACKGROUND

Field

The disclosed embodiments relate to techniques for applying machine learning to complex networks. More specifically, the disclosed embodiments relate to techniques for performing inference via edge label propagation in networks.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as client-server applications and/or devices that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals use an online network to locate prospects, maintain a professional image, establish and maintain relationships, and/or engage with other individuals and organizations. Similarly, recruiters use the online network to search for candidates for job opportunities and/or open positions. At the same time, job seekers use the online network to enhance their professional reputations, conduct job searches, reach out to connections for job opportunities, and apply to job listings.

Moreover, the dynamics of online networks frequently shift as connections or relationships among users evolve. For example, a user commonly adds connections within an online network over time. Each new connection increases the user's interaction with certain parts of the online network and/or decreases the user's interaction with other parts of the online network. Consequently, use of online networks may be increased by characterizing and utilizing relationships and interactions among users of the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for inferring attributes of nodes and/or edges in the network. For example, a complex network is represented using a graph that includes nodes representing users, companies, schools, jobs, and/or other entities, as well as edges between pairs of nodes that represent relationships or interactions between the corresponding entities.

More specifically, the disclosed embodiments provide a method, apparatus, and system for inferring relationships and/or other attributes associated with edges in a network. In these embodiments, a small subset of edges in the network includes a label representing a particular type of relationship and/or another attribute. For example, the label represents a "close colleague" relationship between pairs of members (e.g., users) in an online system, which is generated based on information provided by one or both users in each pair (e.g., tagging of and/or identifying close colleagues in a user interface that displays a list of colleagues to a user). As a result, the "close colleague" relationship reflects the users' preferences or definitions of "closeness" among colleagues instead of predefined criteria for the relationship.

The labeled edges are used to infer the presence or absence of the same type of relationship and/or attribute in remaining edges of the network. First, a machine learning model is trained to predict the label, given attributes associated with pairs of members connected by the labeled edges. For example, features representing similarity and/or connectedness between each pair of members connected by a labeled edge and/or each individual member's engagement with an online system are inputted into the machine learning model, and parameters of the machine learning model are updated so that output of the machine learning model reflects the labeled edges. After the machine learning model is trained, additional features of members pairs not connected by labeled edges are inputted into the machine learning model, and edge scores representing confidences in the type of relationship in the member pairs are obtained as output from the machine learning model.

Next, the edge scores are used to propagate the label from the labeled edges to remaining edges in the network. For example, the label is propagated over a series of iterations that update probabilities of the label for each edge in the network. During a given iteration, the probability of the label for an edge between two nodes is calculated as a combination of edge scores for a set of edges connected to one or both nodes, probabilities of the label for the set of edges, and/or an external prediction of the likelihood of the relationship between the two nodes. The iterations are repeated until the probabilities of the label for the remaining edges converge.

The probabilities of the label are then used to perform tasks and/or generate output that is displayed and/or delivered via the online system. For example, the predicted probability of a "close colleagues" relationship between two users is inputted into another machine learning model that generates relevance scores between one of the users and content that can be displayed to the user. In turn, the relevance scores are used to rank content in a content feed of the online system, which causes content or updates from close colleagues to be surfaced higher and/or more frequently in the feed.

By propagating labels for relationships (or other attributes) across edges in a network based on machine learning predictions of confidences in the relationships and the structure of the network, the disclosed embodiments combine attributes of the edges and topological features of the network to infer likelihoods of the relationships for non-labeled edges in the network. The inferred likelihoods are thus more accurate than conventional machine learning techniques that do not account for topological features, network effect, and/or homophily among users or entities within a given "neighborhood" in the network (e.g., entities that are within a certain number of hops from one another in the network).

The near-linear time complexity with which the labels are propagated additionally reduces overhead and/or improves performance in computer systems on which the label propagation is performed. As a result, the inferences can be updated on a more frequent basis, which further improves the accuracy and/or timeliness of the inferences. The inferences further improve use of and/or access to features and/or content in the online system by the users, which reduces the amount of searching, browsing, filtering, and/or sorting performed by the users to find relevant and/or important content or features in the online system. In turn, the computational load of the online system is reduced, which allows the online system to support a greater number of users and/or perform additional tasks. Consequently, the disclosed embodiments improve computer systems, applications, user experiences, tools, and/or technologies related to inferring attributes of nodes and/or edges in networks, training and executing machine learning models, and/or operating online systems.

Inference Via Edge Label Propagation in Networks

Figure 1:
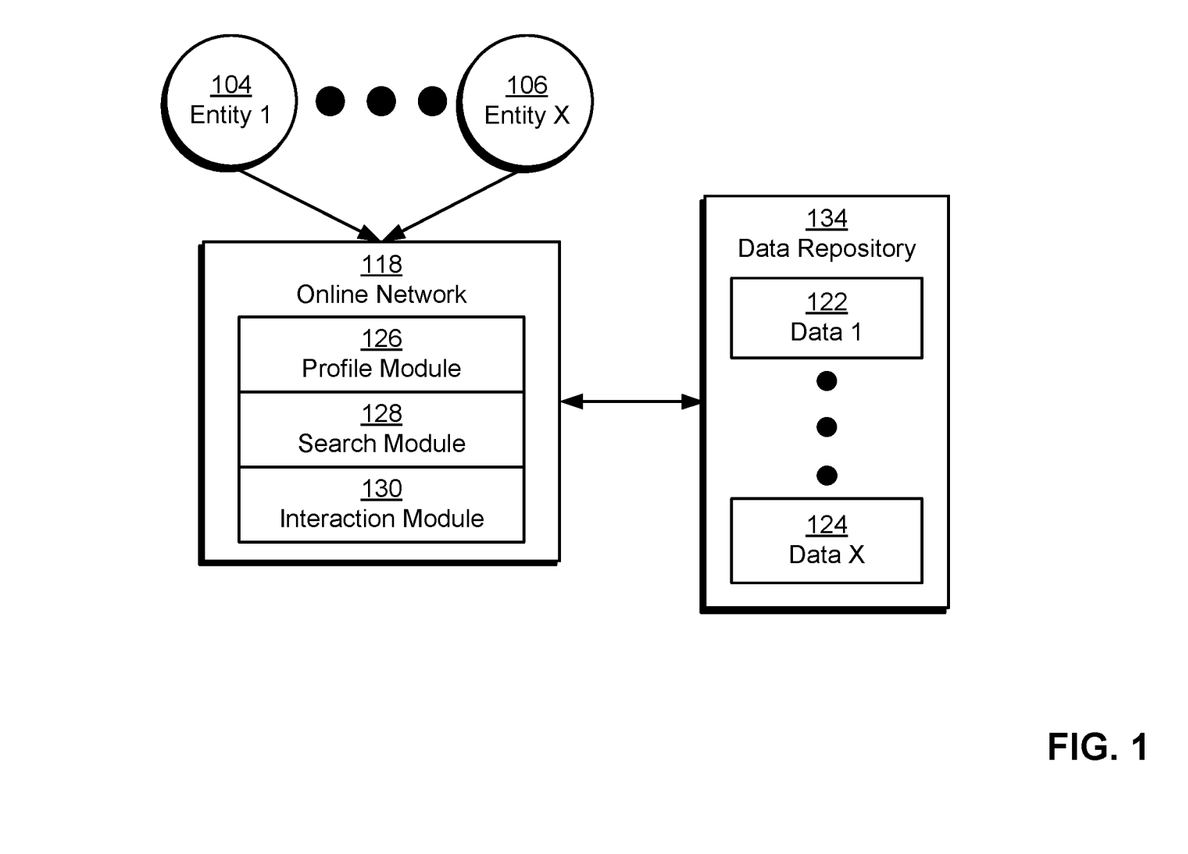
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other information maintained by online network 118. For example, the entities input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Figure 2:
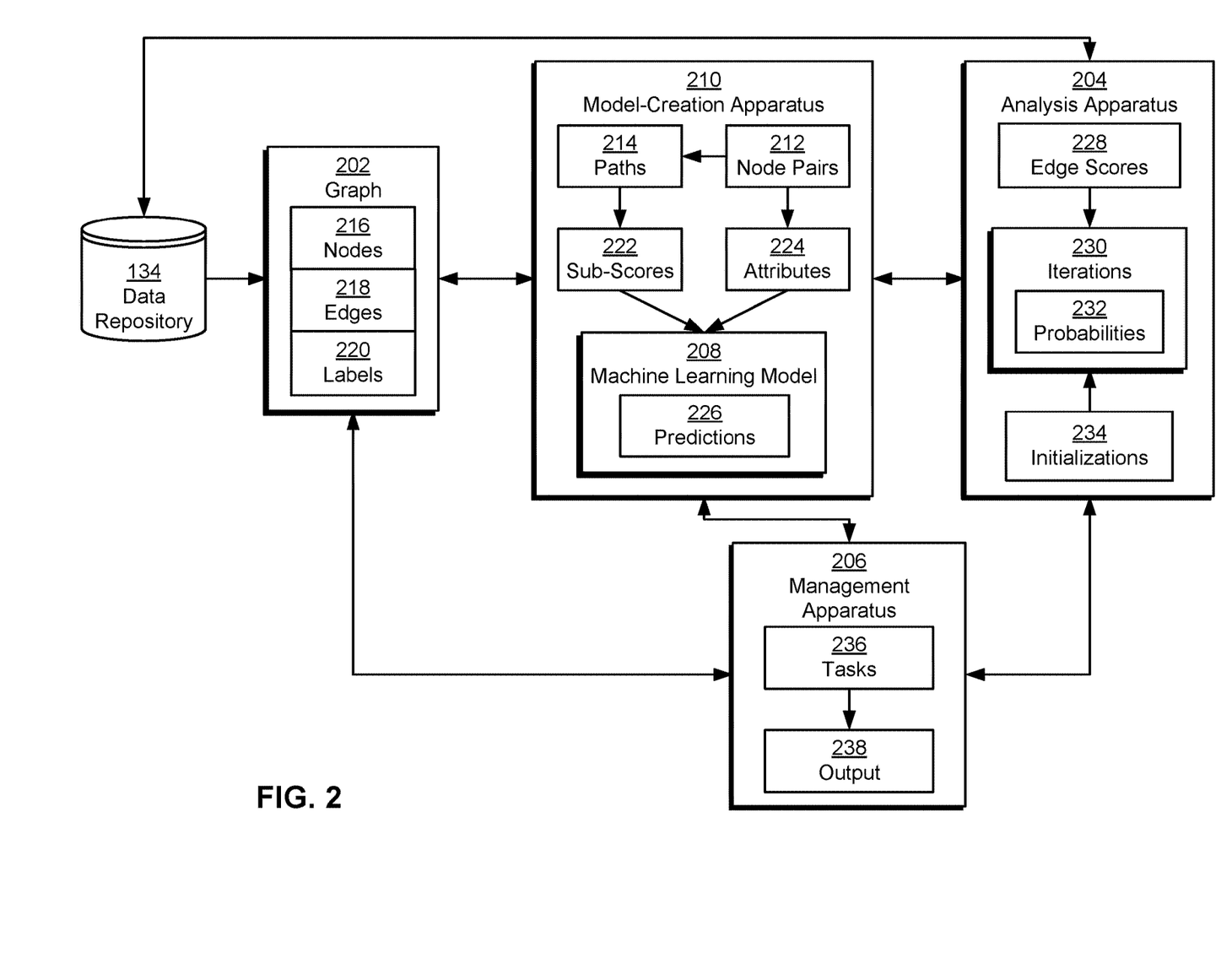
FIG. 2 shows a system for processing data in accordance with the disclosed embodiments.

As shown in FIG. 2, data in data repository 134 is used to form a graph 202 representing entities and the entities' relationships and/or activities in an online system, such as online network 118 of FIG. 1. Graph 202 includes a set of nodes 216, a set of edges 218, and a set of labels 220.

Nodes 216 in graph 202 represent entities in the online system. For example, the entities represented by nodes 216 include individual members (e.g., users) of the online system, groups joined by the members, and/or organizations such as schools and companies. In some embodiments, nodes 216 also represent other objects and/or data in the online professional network, such as industries, locations, posts, articles, multimedia, job listings, advertisements, and/or messages.

Edges 218 represent relationships and/or interaction between pairs of nodes 216 in graph 202. For example, edges 218 include directed and/or undirected edges that specify connections between pairs of members, education of members at schools, employment of members at organizations, business relationships and/or partnerships between organizations, and/or residence of members at locations. Edges 218 also, or instead, indicate actions taken by entities, such as creating or sharing articles or posts, sending messages, connection requests, joining groups, and/or following other entities.

Labels 220 include verified attributes of nodes 216 and/or edges 218. In some embodiments, labels 220 represent certain types of relationships between members of the online system. For example, labels 220 include confirmations of "close friends," "close colleagues," mentor-mentee, and/or other types of relationships involving certain types of interactions or dynamics between members. These relationship-based labels 220 can be stored as attributes of edges 218 between pairs of nodes 216 in graph 202.

In one or more embodiments, labels 220 are generated based on confirmation of the corresponding relationships by users and/or other entities represented by nodes 216 in graph 202. For example, one or more components of the online system obtain labels 220 by prompting members to identify or tag a portion of their connections as close colleagues. As a result, labels 220 reflect the members' definitions or assessments of the "close colleagues" relationship instead of requiring the members to apply a pre-specified definition of the relationship to their connections or colleagues.

A model-creation apparatus 210 trains a machine learning model 208 to predict labels 220 based on a set of features. As shown in FIG. 2, the features include attributes 224 associated with node pairs 212 connected by edges 218 to which labels 220 are assigned. The features also, or instead, include sub-scores 222 for paths 214 connecting node pairs 212 in graph 202.

In some embodiments, model-creation apparatus 210 obtains attributes 224 from data repository 134 and/or generates values of attributes 224 from other data in data repository 134. Attributes 224 include characteristics of members in node pairs 212 and/or comparisons or aggregations of the characteristics. For example, attributes 224 include metrics or scores representing the number of connection invitations received, connection count, and/or job-seeking intent of each member. Attributes 224 also, or instead, include metrics or scores representing the likelihood that the members know one another, the proportion of connections of both members that are shared by the members, overlap in tenure at a school or company, and/or the degree of similarity or sameness in characteristics of the members (e.g., school, company, region, occupation, language, industry, skills, title, etc.).

Model-creation apparatus 210 also determines sub-scores 222 for multiple types of paths 214 between node pairs 212. Each sub-score represents the "strength" of a given type of path between a pair of nodes.

In one or more embodiments, paths 214 include a "similarity" path between each pair of nodes 216 in graph 202. A sub-score for the similarity path is calculated based on a similarity between members represented by the pair of nodes 216. For example, the sub-score is calculated as a cosine similarity, Euclidean distance, cross product, and/or another measure of similarity between attributes 224 of the members and/or embeddings generated by other machine learning models (not shown) from attributes 224.

Paths 214 also, or instead, include a second-degree path between a pair of nodes, which includes labels 220 for one or both edges 218 in the path. For example, the second-degree path includes two nodes 216 that have edges 218 with a third node (e.g., a common connection), as well as labels 220 for both edges 218. As a result, the second-degree path represents a triadic closure of the relationship represented by labels 220 between the two nodes 216.

Paths 214 also or instead, include a first-degree path between a pair of nodes. The first-degree path includes an edge between the nodes, which can represent a connection between the corresponding members in the online system and/or another type of relationship or interaction between the members.

Paths 214 also, or instead, include a path with an attribute that is indicative of the type of relationship associated with labels 220. For example, the attribute includes a "colleagues" attribute for a "close colleagues" relationship represented by labels 220. As a result, the path exists between a pair of nodes 216 with both nodes are connected to a third node representing a company or employer.

In one or more embodiments, model-creation apparatus 210 uses a common formula or technique to generate sub-scores 222 for path types that include the triadic closure of the relationship represented by labels 220, the first-degree path, and/or the attribute that is indicative of the relationship associated with labels 220. For each path type, model-creation apparatus 210 determines a first number of instances of the path type between a given pair of nodes. Model-creation apparatus 210 then divides the first number of instances by the product of a second number of instances of the type of path containing the first node in the pair and a third number of instances of the type of path containing the second node in the pair.

Model-creation apparatus 210 then inputs sub-scores 222 and attributes 224 as features for each pair of nodes with a label into machine learning model 208. Model-creation apparatus 210 uses a training technique and/or one or more hyperparameters to update parameters of machine learning model 208 so that predictions 226 outputted by machine learning model 208 better reflect labels 220.

For example, machine learning model 208 includes a logistic regression model with the following representation:

$$logit(w_{ij}) = \sum_{k=0}^{3} \alpha_k w_{ij}^k + \sum_p \beta_p f_{ij}^p$$

In the above representation, the log odds of a label w between nodes i and j is calculated as a linear combination of two sets of independent variables. The first set of independent variables includes sub-scores 222 represented by $w_{ij}^k$, where k denotes one of four types of paths 214 (e.g., the four path types described above). The second set of independent variables includes attributes 224 represented by $f_{ij}^p$, where p denotes a given type of attribute. The linear combination includes a product of each sub-score with a corresponding coefficient $\alpha_k$, as well as a product of each attribute with a corresponding coefficient $\beta_p$. In turn, the $\alpha_k$ and $\beta_p$ coefficients are learned using maximum likelihood estimation (MLE) based on labels 220 associated with sub-scores and attributes 224.

Prior to training machine learning model 208, model-creation apparatus 210 optionally filters node pairs 212 so that training samples inputted into machine learning model 208 include the attribute that is indicative of the type of relationship to be inferred. For example, model-creation apparatus 210 removes edges 218 and/or node pairs 212 that do not contain the "colleague" attribute from training data for machine learning model 208 before training machine learning model 208 to predict labels 220 for "close colleagues" relationships between members represented by the corresponding node pairs 212.

After machine learning model 208 is trained, model-creation apparatus 210 and/or another component of the system apply machine learning model 208 to unlabeled edges 218 in graph 202 to generate edge scores 228 representing predictions 226 of labels 220 in the unlabeled edges 218. For example, the component obtains and/or generates sub-scores 222 for paths 214 between each node pair connected by an unlabeled edge, as well as attributes 224 associated with one or both nodes in the pair. The component inputs sub-scores 222 and attributes 224 into machine learning model 208 and obtains, as output from machine learning model 208, an edge score between 0 and 1 representing the confidence that the type of relationship exists between the nodes. The component then stores the edge score in data repository 134 and/or another data store and/or provides the edge score to analysis apparatus 204, management apparatus 206, and/or another component of the system for subsequent processing and use.

In some embodiments, model-creation apparatus 210 uses a positive-unlabeled (PU) learning technique to train machine learning model 208 and/or generate edge scores 228 for unlabeled edges 218. The PU learning technique generates negative labels (e.g., labels that indicate an absence of the relationship associated with labels 220) for a subset of edges 218 and corresponding node pairs 212 that lack labels 220.

For example, the PU learning technique assigns negative labels to all unlabeled edges 218 in graph 202 and performs downsampling of the negatively labeled set before training machine learning model 208 using samples in the negatively labeled set. After machine learning model 208 is trained using the positive and downsampled negative labels, the PU learning technique optionally uses the trained machine learning model 208 to generate predictions 226 of negative labels for other edges 218 and retrains machine learning model 208 using the newly predicted negative labels. The retrained machine learning model 208 is then used to produce updated predictions 226 that are used as edge scores 228 for remaining unlabeled edges 218.

In another example, the PU learning technique creates a training dataset that includes all labels 220 and a random sample of unlabeled edges 218 and/or node pairs 212. The PU learning technique trains machine learning model 208 using the training dataset and subsequently applies the trained machine learning model 208 to remaining unlabeled edges 218 and/or node pairs 212 to generate predictions 226 of confidence in the relationship for the remaining samples. The PU learning techniques repeats the process of training machine learning model 208 using samples with positive labels 220 and randomly selected samples assigned negative labels, followed by using the trained machine learning model 208 to generate predictions 226 remaining samples. After a certain number of predictions 226 are generated by multiple versions of machine learning model 208 for a given unlabeled sample, an edge score for the sample is obtained as the average of all predictions 226 produced for the sample by the versions.

Analysis apparatus 204 uses the structure of graph 202, edge scores 228 outputted by machine learning model 208 for unlabeled edges 218, and labels 220 to infer probabilities 232 of labels 220 and/or the corresponding relationship in the unlabeled edges 218. For example, each probability includes a value ranging from 0 to 1 that accounts for the edge score outputted by machine learning model 208 for the corresponding edge, edge scores 228 for other unlabeled edges 218 in the proximity of the edge, and/or the distance from the edge to edges 218 with labels 220.

In one or more embodiments, analysis apparatus 202 calculates probabilities 232 over a set of iterations 230 that propagate labels 220 from edges 218 to which labels 220 are assigned to remaining edges 218 in graph 202. Prior to performing iterations 230, analysis apparatus 202 optionally filters edges 218 with edge scores 228 that fall below a threshold from graph 202. For example, analysis apparatus 202 removes edges 218 with edge scores 228 that do not meet a numeric, percentile, or other threshold from graph 202 to reduce density and/or noise in graph 202. Analysis apparatus 202 also, or instead, removes edges 218 that do not meet thresholds for sub-scores 222 and/or attributes 224 associated with the corresponding node pairs 212 from graph 202. In turn, iterations 230 can be performed more efficiently and/or used to produce more accurate probabilities 232 than iterations 230 that are applied to a full graph 202 and/or edges 218 with low edge scores 228 in graph 202.

In some embodiments, each iteration involves updating a probability of a label for each edge between two nodes 216 based on edge scores 228 for a subset of edges 218 connected to one or both nodes 216, probabilities 232 of the label for the subset of edges 218, and/or an external prediction of the likelihood of the type of relationship between the nodes. Each iteration additionally involves initializations 234 of probabilities 232 for some edges 218 prior to updating probabilities 232 of other edges 218 based on the initialized probabilities.

For example, each probability is represented by a belief $b_{ij}^{(k)}$, where i and j represent nodes 216 for which the probability is computed and k denotes the iteration number. Prior to starting iterations 230, analysis apparatus 204 performs initializations 234 of probabilities 232 of edges 220, such that an edge with a label is assigned a probability of 1 and an edge without the label is assigned a probability of 0. In other words, $b_{ij}^{(0)}=1$ if the edge between i and j have a positive label for the relationship, and $b_{ij}^{(0)}=0$ otherwise.

During each iteration, analysis apparatus 204 updates the probability of each unlabeled edge using the following equation:

$$b_{ij}^{(k+1)} = \frac{\gamma_0 \left( \sum_{g \neq j} w_{gi} b_{gi}^{(k)} + \sum_{h \neq i} w_{jh} b_{jh}^{(k)} + \sum_{o} w_{io} b_{io}^{(k)} \cdot w_{oj} b_{oj}^{(k)} \right)}{(\gamma_0 + \gamma_1)\left( \sum_{g \neq j} w_{gi} + \sum_{h \neq i} w_{jh} \right)} + \frac{\gamma_1(w_{ij})}{(\gamma_0 + \gamma_1)}$$

In the above equation, g represents the set of nodes to which i is connected (excluding j), h represents the set of nodes to which j is connected (excluding i), and o represents the set of nodes to which both i and j are connected (i.e., common neighbors of i and j). The equation includes a first term and a second term that are summed to produce the probability of the label for nodes 216 i and j during the (k+1)th iteration, or $b_{ij}^{(k+1)}$.

The first term includes a numerator with three components: a linear combination of edge scores 228 and probabilities 232 from the kth iteration for edges 218 connected to i (excluding the edge between i and j), a linear combination of edge scores 228 and probabilities 232 from the kth iteration for edges 218 connected to j (excluding the edge between i and j), and a linear combination of edge scores 228 and probabilities 232 from the kth iteration for pairs of edges from i and j to common neighbors of i and j.

In the equation, $b_{i_o}$ and $b_{o_j}$ are optionally limited to beliefs of edges 218 with labels 220. Thus, the third component of the first term may include contributions from triadic closures of the relationship represented by labels 220 between i and j.

The first term includes a denominator with a summation of all edge scores 228 used in the numerator, which scales the first term to a value between 0 and 1. As a result, the first term is used to propagate labels 220 to the edge between i and j from adjacent edges in graph 202.

The second term includes a value $w_{ij}$, which represents an external prediction of the likelihood or confidence in the label between i and j. The external prediction can be obtained as an edge score for the edge from machine learning model 208 and/or another type of score from another machine learning model.

Two additional parameters $\gamma_0$ and $\gamma_1$ are used to balance the contribution of the external prediction with the contribution of the label propagation to the resulting probability. When $\gamma_0$ is higher, the label propagation contributes more to the probability; when $\gamma_1$ is higher, the external prediction contributes more to the probability. The $\gamma_0$ and $\gamma_1$ parameters can be adjusted via cross-validation and/or selected to provide the best convergence and/or accuracy in probabilities 232.

At the end of each iteration, analysis apparatus 204 resets probabilities 232 for labeled edges 218 to 1. Analysis apparatus 204 then performs one or more subsequent iterations 230 until probabilities 232 converge (e.g., reach substantially stable values). After convergence is reached, analysis apparatus 204 stores probabilities 232 in association with the corresponding edges 216 in graph 202 and/or data repository 134. Analysis apparatus 204 also, or instead, provides probabilities 232 to model-creation apparatus 210 (e.g., for use in retraining of machine learning model 208 and/or another machine learning model), a management apparatus 206, and/or another component of the system.

In one or more embodiments, management apparatus 206 performs tasks 236 and/or generates output 238 in the online system based on probabilities 232. For example, management apparatus 206 inputs probabilities 232 of a "close colleagues" relationship between pairs of members with other features into another machine learning model, and the other machine learning model generates relevance scores for content or updates from the members. Management apparatus 206 then orders the content by descending relevance score within a member's content feed in the online system, so that content or updates from close colleagues is surfaced higher and/or more frequently in the feed.

In another example, management apparatus 206 inputs the probability of a "close colleagues" relationship between a pair of members with other features into another machine learning model, and the other machine learning model outputs a predicted likelihood that the members know one another. The predicted likelihood is then used to generate a recommendation of one member to the other as a connection or participant in another type of interaction.

In a third example, management apparatus 206 generates a ranking of members by descending probabilities 232 of being close colleagues with a given member. Management apparatus 206 outputs the highest-ranked portion of members in the ranking as "close colleague" suggestions to the member. After the member confirms the close-colleague relationship with some or all members in the ranking, management apparatus 206 prioritizes the member's close colleagues in the content feed, messaging system, and/or other features or modules of the online system. Management apparatus 206 also, or instead, generates new labels 220 for edges 218 between the member and his/her close colleagues, and model-creation apparatus 210 uses the new labels 220 to retrain machine learning model 208. Analysis apparatus 204 then uses updated edge scores 228 from machine learning model 208 to recalculate probabilities 232, which allows management apparatus 206 to further improve tasks 236 and/or output 238 related to the type of relationship for which probabilities 232 were generated.

By propagating labels 220 for relationships (or other attributes) across edges 218 in a network based on machine learning predictions of confidences in the relationships and the structure of the network, the disclosed embodiments combine attributes of edges 218 and topological features of the network to infer likelihoods of the relationships for non-labeled edges 218 in the network. The inferred likelihoods are thus more accurate than conventional machine learning techniques that do not account for topological features, network effect, and/or homophily among users or entities within a given "neighborhood" in the network (e.g., entities that are within a certain number of hops from one another in the network).

The near-linear time complexity with which labels 220 are propagated additionally reduces overhead and/or improves performance in computer systems on which the label propagation is performed. As a result, inferences of probabilities 232 can be updated on a more frequent basis, which further improves the accuracy and/or timeliness of the inferences. The improved inferences further enhance use of and/or access to features and/or content in the online system by the members, which reduces the amount of searching, browsing, filtering, and/or sorting performed by the members to find relevant and/or important content or features in the online system. In turn, the computational load of the online system is reduced, which allows the online system to support a greater number of members and/or perform additional tasks. Consequently, the disclosed embodiments improve computer systems, applications, user experiences, tools, and/or technologies related to inferring attributes of nodes and/or edges in networks, training and executing machine learning models, and/or operating online systems.

Those skilled in the art will appreciate that the system of FIG. 2 may be implemented in a variety of ways. First, analysis apparatus 204, management apparatus 206, model-creation apparatus 210, and/or data repository 134 may be provided by a single physical machine, multiple computer systems, one or more virtual machines, a grid, one or more databases, one or more filesystems, and/or a cloud computing system. Analysis apparatus 204, management apparatus 206, and model-creation apparatus 210 may additionally be implemented together and/or separately by one or more hardware and/or software components and/or layers.

Second, a number of models and/or techniques may be used to generate edge scores 228 and/or probabilities 232. For example, the functionality of machine learning model 208 may be provided by one or more regression models, support vector machines, artificial neural networks, Bayesian networks, tree-based models, and/or ensemble models. Multiple versions of machine learning model 208 may be adapted to different types of nodes 216, edges 218, and/or labels 220, or the same machine learning model 208 may be used to generate edge scores 228 and/or probabilities 232 for all nodes 216 and/or edges 218 in graph. The retraining or execution of each machine learning model may further be performed on an offline, online, and/or on-demand basis to accommodate requirements or limitations associated with the processing, performance, or scalability of the system and/or the availability of labels 220 used to train the machine learning model.

Third, the functionality of the system may be adapted to various types of relationships and/or attributes of edges in networks and/or graphs. For example, the system of FIG. 2 may be used to infer interactions, relationships, and/or outcomes between nodes representing users, locations, companies, schools, governments, goods, services, animals, content, and/or other entities.

Figure 3:
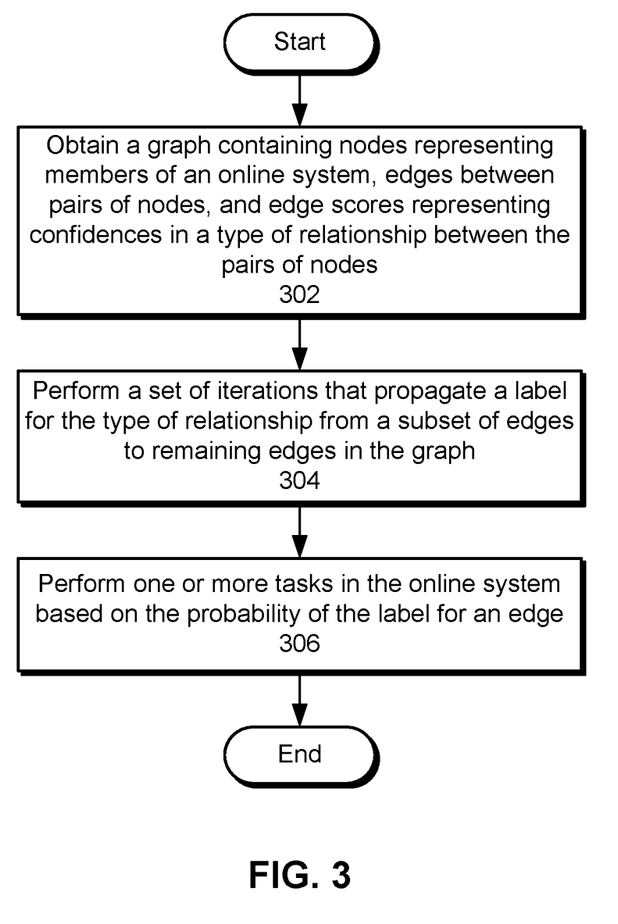
FIG. 3 shows a flowchart illustrating a process of inferring relationships in a network in accordance with the disclosed embodiments.

FIG. 3 shows a flowchart illustrating a process of inferring relationships in a network in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a graph containing nodes representing members of an online system, edges between pairs of nodes, and edge scores representing confidences in a type of relationship between the pairs of nodes is obtained (operation 302), as described in further detail below with respect to FIG. 4. For example, the graph models connections and/or interactions between the members, and the edge scores represent predictions by a machine learning model of confidence in a close-colleague relationship between each pair of members.

Next, a set of iterations that propagate a label for the type of relationship from a subset of edges to remaining edges in the graph is performed (operation 304). For example, the label is assigned to the subset of edges based on confirmation of the type of relationship by members connected via the edges. Prior to performing each iteration, the probability of the label is set to 1 for all of the labeled edges. Each iteration includes updating the probability of the label for an unlabeled edge between two nodes based on a subset of the edge scores for additional edges connected to one or both nodes, probabilities of the label for the additional edges, and/or an external prediction of a likelihood of the type of relationship between the pair of nodes. One or more parameters are used to balance the contribution of a linear combination of the edge scores and probabilities for the additional edges with the contribution of the external prediction to the probability.

One or more tasks in the online system are then performed based on the probability of the label for an edge (operation 306). For example, the probability that a close-colleague relationship exists between two members is used to order content outputted in the online system to one or both members, generate a recommendation of one member to another, and/or transmit a notification related to one member to the other member.

Figure 4:
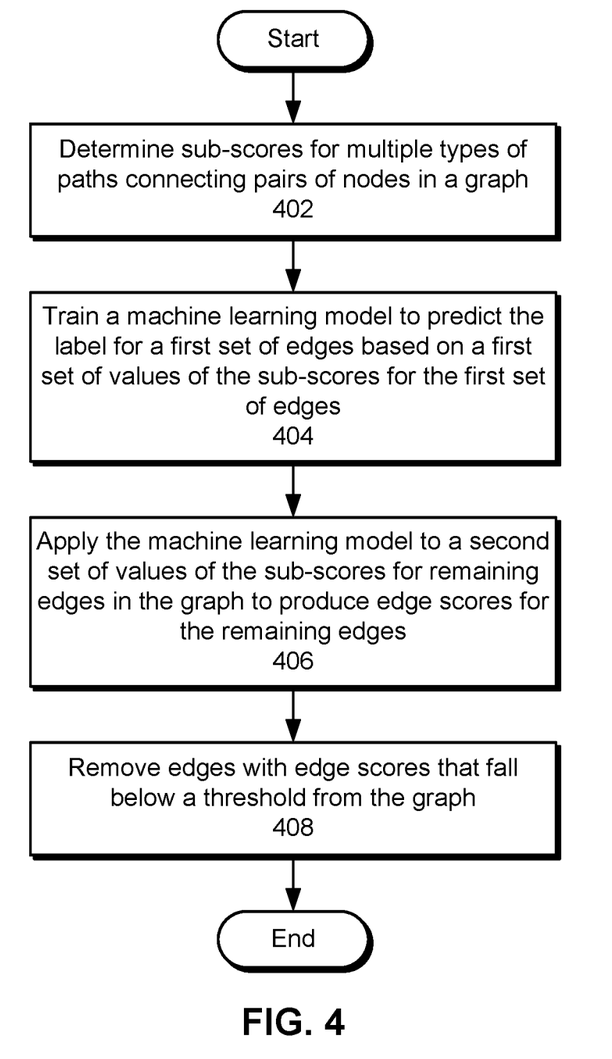
FIG. 4 shows a flowchart illustrating a process of generating a graph for use in propagating a label in a network in accordance with the disclosed embodiments.

FIG. 4 shows a flowchart illustrating a process of generating a graph for use in propagating a label in a network in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, sub-scores for multiple types of paths connecting pairs of nodes in a graph are determined (operation 402). For example, the types of paths include a "similarity path" representing a degree of similarity between two nodes, a first-degree connection path that exists when two nodes are connected by an edge, a second-degree connection path that includes the label, and/or a path containing an attribute that is indicative of a relationship confirmed using the label (e.g., a colleague attribute for a close-colleagues relationship). The sub-score for the similarity path is calculated as a cosine similarity and/or another measure of similarity between attributes of the nodes and/or embedded representations of the attributes. A sub-score for each remaining path type is calculated by dividing a first number of instances of the path type between the two nodes by a product of a second number of instances of the path type containing the first node and a third number of instances of the path type containing the second node.

Next, a machine learning model is trained to predict the label for a first set of edges based on a first set of values of the sub-scores for the first set of edges (operation 404). For example, features that include the first set of values of the sub-scores and attributes for a subset of nodes connected by the first set of the edges are inputted into the machine learning model, and parameters of the machine learning model are updated so that the output of the machine learning model reflects an explicit label for the first set of the edges. A PU learning technique is also used to generate negative labels for a portion of unlabeled edges and train the machine learning model to predict the negative labels based on the corresponding features.

The machine learning model is applied to a second set of values of the sub-scores for remaining edges in the graph to produce edge scores for the remaining edges (operation 406). For example, the machine learning model generates a value between 0 and 1 representing the confidence in the label for each of the remaining edges.

Finally, edges with edges scores that fall below a threshold are removed from the graph (operation 408). For example, the edges may be removed to reduce density and/or noise in the graph and expedite subsequent label propagation within the graph.

Figure 5:
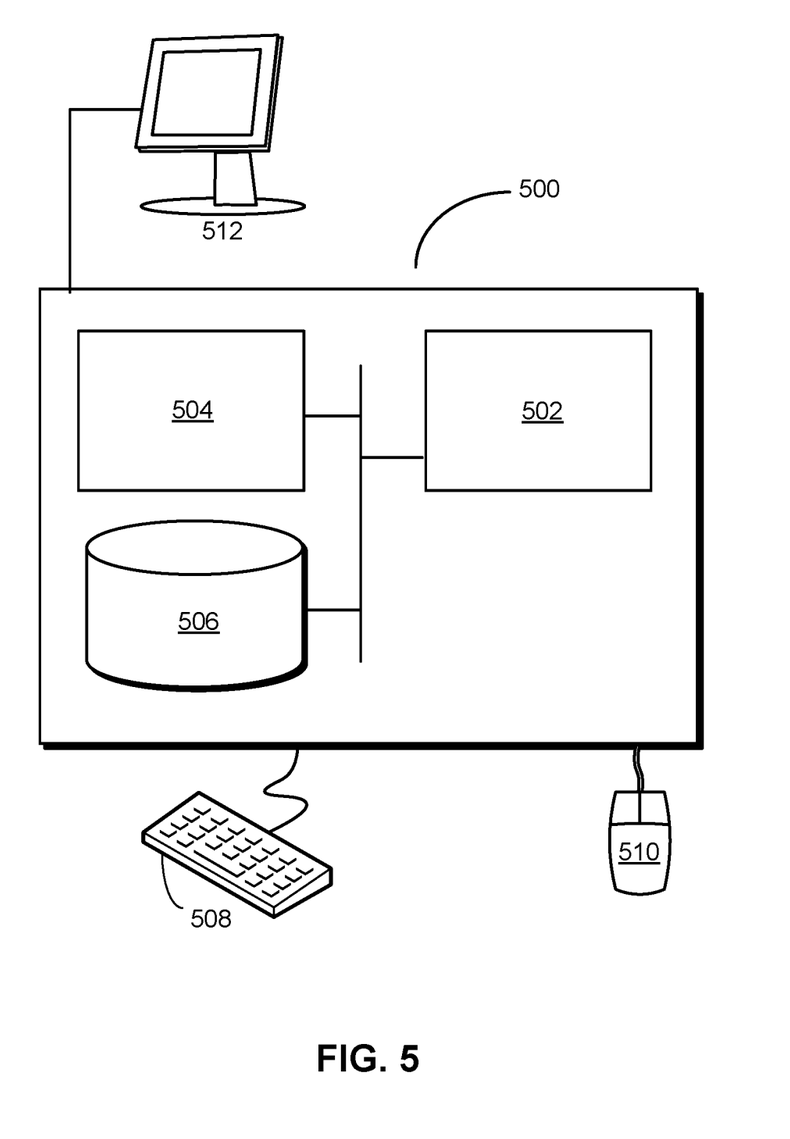
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the disclosed embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing inference via label propagation in networks. The system includes a model-creation apparatus, an analysis apparatus, and a management apparatus, one or more of which may alternatively be termed or implemented as a module, mechanism, or other type of system component. The model-creation apparatus and/or analysis apparatus generate a graph containing nodes representing members of an online system, edges between pairs of nodes, and edge scores representing confidences in a type of relationship between the pairs of nodes. Next, the analysis apparatus performs a set of iterations that propagate a label for the type of relationship from a first subset of edges to remaining edges in the graph, with each iteration updating a probability of the label for an edge between a pair of nodes based on a subset of the edge scores for a second subset of edges connected to one or both nodes in the pair and probabilities of the label for the second subset of edges. The management apparatus then performs one or more tasks in the online system based on the probability of the label for the edge.

In addition, one or more components of computer system 500 may be remotely located and connected to the other components over a network. Portions of the present embodiments (e.g., model-creation apparatus, analysis apparatus, management apparatus, data repository, online network, etc.) may also be located on different nodes of a distributed system that implements the embodiments. For example, the present embodiments may be implemented using a cloud computing system that infers relationships or attributes between a set of remote members.

By configuring privacy controls or settings as they desire, members of a social network, online professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
    obtaining data representing a graph comprising nodes and edges connecting nodes, each node in the graph representing an end-user of an online system, wherein each edge in a first subset of edges connecting pairs of nodes has an edge score representing a confidence in a type of relationship existing between the end-users represented by the pair of nodes;
    performing a set of iterations that propagate a label for the type of relationship from the first subset of the edges to remaining edges in the graph, wherein each iteration in the set of iterations comprises updating a probability of the label for an edge between a pair of nodes based on a subset of the edge scores for a second subset of the edges connected to one or both nodes in the pair and probabilities of the label for the second subset of the edges; and
    performing a task in the online system based on the probability of the label for the edge.

2. The method of claim 1, wherein obtaining the data representing the graph comprises:
    determining sub-scores for multiple types of paths connecting the pairs of nodes;
    training a machine learning model to predict the label for the first subset of the edges based on a first set of values of the sub-scores for the first subset of the edges; and
    applying the machine learning model to a second set of values of the sub-scores for the remaining edges to produce the edge scores for the remaining edges.

3. The method of claim 2, wherein determining the sub-scores for the multiple types of paths connecting the pairs of the nodes comprises:
    calculating a sub-score between a first node and a second node based on a similarity between attributes of the first node and the second node.

4. The method of claim 2, wherein determining the sub-scores for the multiple types of paths connecting the pairs of the nodes comprises:
    calculating a sub-score between a first node and a second node by dividing a first number of instances of a type of path between the first and second nodes by a product of a second number of instances of the type of path containing the first node and a third number of instances of the type of path containing the second node.

5. The method of claim 2, wherein training the machine learning model to predict the label for the first subset of the edges comprises:
    inputting features comprising the first set of values of the sub-scores and attributes for a subset of nodes connected by the first subset of the edges into the machine learning model; and
    updating parameters of the machine learning model so that an output of the machine learning model reflects the label for the first subset of the edges.

6. The method of claim 5, wherein the attributes comprise at least one of:
    an engagement of a member with the online system; and
    a degree of commonality between two members of the online system.

7. The method of claim 2, wherein obtaining the graph further comprises:
    removing a third subset of edges with values of the edge scores that fall below a threshold from the graph.

8. The method of claim 2, wherein the multiple types of paths comprise at least one of:
    a first-degree connection;
    a second-degree connection that includes the label; and
    an attribute that is indicative of the type of relationship.

9. The method of claim 1, wherein each iteration in the set of iterations further comprises:
updating the probability of the label based on an external prediction of a likelihood of the type of relationship between the pair of nodes.

10. The method of claim 9, wherein updating the probability of the label based on the external prediction of the likelihood of the type of relationship between the pair of nodes comprises:
calculating the probability of the label based on a combination of the subset of the edge scores for the second subset of the edges, the probabilities of the label for the second subset of the edges, the external prediction, and one or more parameters for controlling contributions of other components in the combination to the probability of the label.

11. The method of claim 1, wherein the task comprises at least one of:
ordering content outputted in the online system;
generating a recommendation comprising a member of the online system; and
transmitting a notification related to the member.

12. The method of claim 1, wherein the type of relationship comprises a close-colleague relationship between the end-users represented by the pair of nodes.

13. A system comprising:
one or more processors; and
memory storing instructions that, when executed by the one or more processors, cause the system to:
generate a graph comprising nodes and edges, each node in the graph representing an end-user of an online system, wherein each edge in a first subset of edges connecting a pair of nodes has an edge score representing a confidence in a type of relationship between the end-users represented by the pair of nodes, wherein the graph is generated based on sub-scores for multiple types of paths connecting the pairs of the nodes;
perform a set of iterations that propagate a label for the type of relationship from a first subset of the edges to remaining edges in the graph, wherein each iteration in the set of iterations comprises updating a probability of the label for an edge between a pair of nodes based on a subset of the edge scores for a second subset of the edges connected to one or both nodes in the pair and probabilities of the label for the second subset of the edges; and
perform one or more tasks in the online system based on the probability of the label for the edge.

14. The system of claim 13, wherein generating the graph comprises:
determining the sub-scores for the multiple types of paths connecting the pairs of the nodes;
training a machine learning model to predict the label for the first subset of the edges based on a first set of values of the sub-scores for the first subset of the edges;
training the machine learning model to predict a negative label for a sampled subset of the edges from the remaining edges; and
applying the machine learning model to a second set of values of the sub-scores for the remaining edges to produce the edge scores for the remaining edges.

15. The system of claim 14, wherein determining the sub-scores for the multiple types of paths connecting the pairs of the nodes comprises:
calculating a first sub-score between a first node and a second node based on a similarity between attributes of the first node and the second node; and
calculating a second sub-score between a third node and a fourth node by dividing a first number of instances of a type of path between the third and fourth nodes by a product of a second number of instances of the type of path containing the third node and a third number of instances of the type of path containing the fourth node.

16. The system of claim 14, wherein generating the graph further comprises:
removing a third subset of edges with values of the edge scores that fall below a threshold from the graph.

17. The system of claim 13, wherein each iteration in the set of iterations further comprises:
updating the probability of the label based on an external prediction of a likelihood of the type of relationship between the pair of nodes.

18. The system of claim 17, wherein updating the probability of the label based on the external prediction of the likelihood of the type of relationship between the pair of nodes comprises:
calculating the probability of the label based on a combination of the subset of the edge scores for the second subset of the edges, the probabilities of the label for the second subset of the edges, the external prediction, and one or more parameters for controlling contributions of other components in the combination to the probability of the label.

19. The system of claim 13, wherein the multiple types of paths comprise at least one of:
a first-degree connection;
a second-degree connection that includes the label; and
an attribute that is indicative of the type of relationship.

20. A non-transitory computer-readable storage medium storing instructions that when executed by a computer cause the computer to perform a method, the method comprising:
obtaining a graph comprising nodes representing members of an online system, edges between pairs of the nodes, and edge scores representing confidences in a type of relationship between the pairs of the nodes;
performing a set of iterations that propagate a label for the type of relationship from a first subset of the edges to remaining edges in the graph, wherein each iteration in the set of iterations comprises updating a probability of the label for an edge between a pair of nodes based on a subset of the edge scores for a second subset of the edges connected to one or both nodes in the pair and probabilities of the label for the second subset of the edges; and
performing one or more tasks in the online system based on the probability of the label for the edge.

* * * * *